(12) United States Patent
Maguire

(10) Patent No.: US 7,100,353 B1
(45) Date of Patent: Sep. 5, 2006

(54) PORTABLE TRACK LINK DISASSEMBLY TOOL

(75) Inventor: Roy L. Maguire, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/204,137

(22) Filed: Aug. 15, 2005

(51) Int. Cl.
*B21L 9/06* (2006.01)
*B21L 21/00* (2006.01)

(52) U.S. Cl. .................. 59/7; 269/43; 269/95; 269/104; 59/901; 59/11

(58) Field of Classification Search .............. 59/7, 59/11, 901; 269/43, 95, 104
See application file for complete search history.

(56) References Cited

U.S. PATENT DOCUMENTS

| | | | | |
|---|---|---|---|---|
| 3,711,928 A | * | 1/1973 | Boggs | 29/402.02 |
| 5,214,907 A | * | 6/1993 | Livesay et al. | 59/7 |
| 5,222,354 A | * | 6/1993 | Rothstein | 59/7 |
| 6,951,096 B1 | * | 10/2005 | Maguire et al. | 59/7 |

* cited by examiner

*Primary Examiner*—David B. Jones
(74) *Attorney, Agent, or Firm*—Jeffrey A. Greene

(57) ABSTRACT

A portable disassembly tool is provided to disassemble a track link assembly from a machine by removing opposed track links from the track link assembly. The portable disassembly tool includes first and second members that are tightly secured to the track link to be removed by a plurality of fasteners. The second member has clearance holes therein to freely receive the ends of the associated track pin assemblies. A third member having spacer members extending therefrom is disposed adjacent to the second member with the spacer members extending into the respective clearance holes into contact with the ends of the track pin assemblies and secured to the second member by a second plurality of fasteners. By alternately tightening the plurality of fasteners, the track link is pulled from the associated track pin assemblies. During the removal of the track link, binding in any direction is overcome.

7 Claims, 4 Drawing Sheets

PORTABLE TRACK LINK DISASSEMBLY TOOL

TECHNICAL FIELD

This invention relates generally to a track link disassembly tool and more particularly to a portable track link disassembly tool that overcomes binding of the track link during disassembly.

BACKGROUND

Various disassembly tools are known. Many of the known track link disassembly tools are stationary machines that have tooling mounted thereon that attaches to the member to be removed and is then hydraulically pulled from the assembly. Other known disassembly tools function to force the link assembly pins from the assembly thus freeing the respective links. In known track assemblies that are mounted on a machine, a master link has been used to assemble and disassemble the track assembly on the machine. In other known track assemblies, a master link has not been used. Consequently, when a master link is not used, it is necessary to use a portable track link assembly/disassembly tool to mount or dismount the track assembly on or from the machine. When removing the respective track links from the track assembly, it is necessary to pull the respective track links in a straight line that is parallel with the respective track pins. If the track link is not pulled in a straight line with respect to the track pins, the track link will bind on the pin and result in damaging the link and/or pins. Once the link binds with respect to the track pins, it may be very difficult to remove the track link from the pins. There are at least two different ways that the track link can bind with respect to the track pins. One way is that one end of the track link is pulled further than the other end. Another way is that the top of the track link is pulled further than the bottom. One known portable disassembly tool is illustrated in US Publication #2003-0217453, published Nov. 27, 2003 and assigned to the same Assignee as the subject application. This known portable disassembly tool functions to remove a track link by clamping the disassembly tool to one of the track links and pushing against the associated track pins to urge the track link from the track pins. This known disassembly tool is effective in overcoming the one type of binding, that is, one end of the track link being pulled further than the other. In the known disassembly tool, if the track link begins to bind on the track pins, the force being exerting against one of the pins can be altered with respect to the other force so that the respective ends of the track link are pulled/moved at the same rate. However, this known disassembly tool has no provision to keep the track link straight from top to bottom with respect to the associated track pins.

The subject invention is directed to overcoming one or more of the problems as set forth above.

SUMMARY OF THE INVENTION

In one aspect of the present invention, a portable disassembly tool is provided for removing a track link from a track link assembly having a plurality of track links operatively coupled to a plurality of track pin assemblies. The portable disassembly tool includes a first member, a second member, a third member and first and second pluralities of fasteners. The first member has a first, flat side and a second side with a plurality of holes defined therein between the first, flat side and the second side. The second member has a first, flat side and a second side, a first plurality of holes defined in the second member between the first, flat side and the second side thereof and disposed therein in matching relationship with the plurality of holes in the first member, a second plurality of holes defined in the second member between the first, flat side and the second side, and a pair of clearance holes defined in the second member between the first, flat side and the second side. The respective clearance holes being spaced from one another at a predetermined distance and of a size sufficient to freely receive the end of the respective track pin assemblies of the track link assembly. The third member has first and second sides, a plurality of holes defined in the third member in matching relationship with the second plurality of holes in the second member, and first and second spacer members connected to and extending from the first side of the third member. The first and second spacer members are spaced from one another at a predetermined distance that is equal to the predetermined distance of the clearance holes that are defined in the second member and of a size sufficient to freely pass through the respective clearance holes in the second member. The first plurality of fasteners is operative to connect the first and second members through the plurality of holes in the first member and the first plurality of holes in the second member and the second plurality of fasteners is operative to connect the second and third members through the second plurality of holes in the second member and the plurality of holes in the third member.

In another aspect of the present invention a method is provided for removing a track link from a track link assembly having a plurality of track links that are operatively coupled by a plurality of track pin assemblies. The method includes the steps of providing a first member having a first, flat side and a second side with a plurality of holes defined therein between the first and second sides; providing a second member having a first, flat side and a second side, a first plurality of holes defined in the second member between the first, flat side and the second side thereof and disposed therein in matching relationship with the plurality of holes in the first member, a second plurality of holes defined in the second member between the first, flat side and the second side, and a pair of clearance holes defined in the second member between the first, flat side and the second side, the respective clearance holes being spaced from one another at a predetermined distance and of a size sufficient to freely receive the end of the respective track pin assemblies of the track link assembly; clamping the track link to be removed between the first and second members by locating the first member on the inside of the track link, locating the second member on the outside of the track link and securing the first and second members together with a plurality of fasteners disposed in the plurality of holes of the first and second members; providing a third member having first and second sides, a plurality of holes being defined in the third member in matching relationship with the second plurality of holes in the second member, first and second spacer members being connected to and extending from the first side of the third member, the first and second spacer members being spaced from one another at a predetermined distance that is equal to the predetermined distance of the clearance holes defined in the second member and of a size sufficient to freely pass through the respective clearance holes in the second member; locating the first and second spacers of the third member within the first and second clearance holes of the second member and into contact with the end of the respective ones of the track pin assemblies and securing the third member to the second members with a second plurality of fasteners being disposed in the plurality of holes in the third member and the second plurality of holes defined in the second member; and pulling the track link that is clamped between the first and second members from the associated track pin assemblies by alternately tightening the respective fasteners of the second plurality of fasteners.

DETAILED DESCRIPTION

Figure 1:
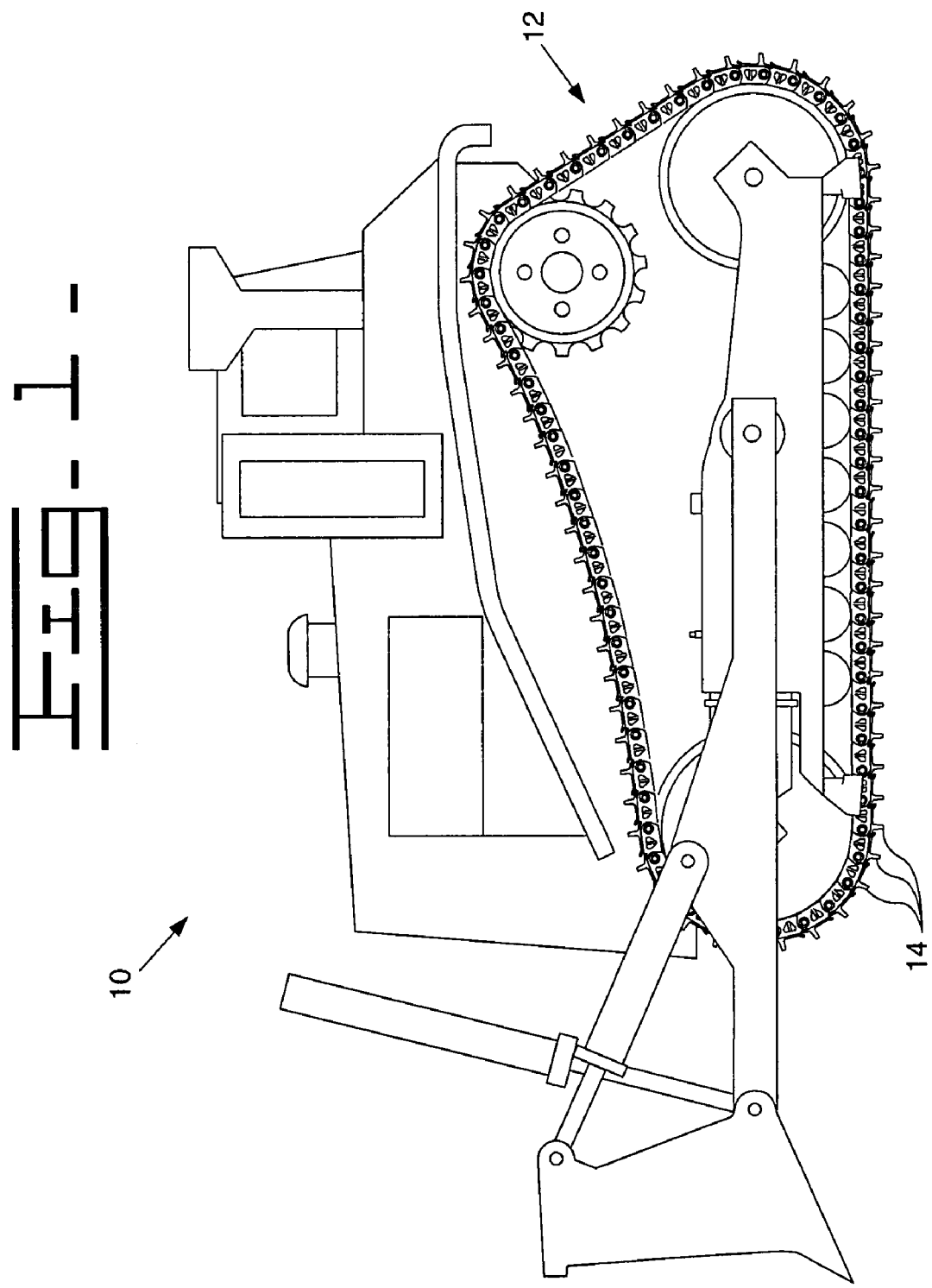
FIG. 1 is a diagrammatic representation of a machine having a track assembly mounted thereon.

Referring to FIG. 1 of the drawings, a machine 10 is illustrated having a continuous track assembly 12 disposed thereon. The track assembly 12 has a plurality of track shoes 14 secured to a track link assembly 16 in a well know manner.

Figure 2:
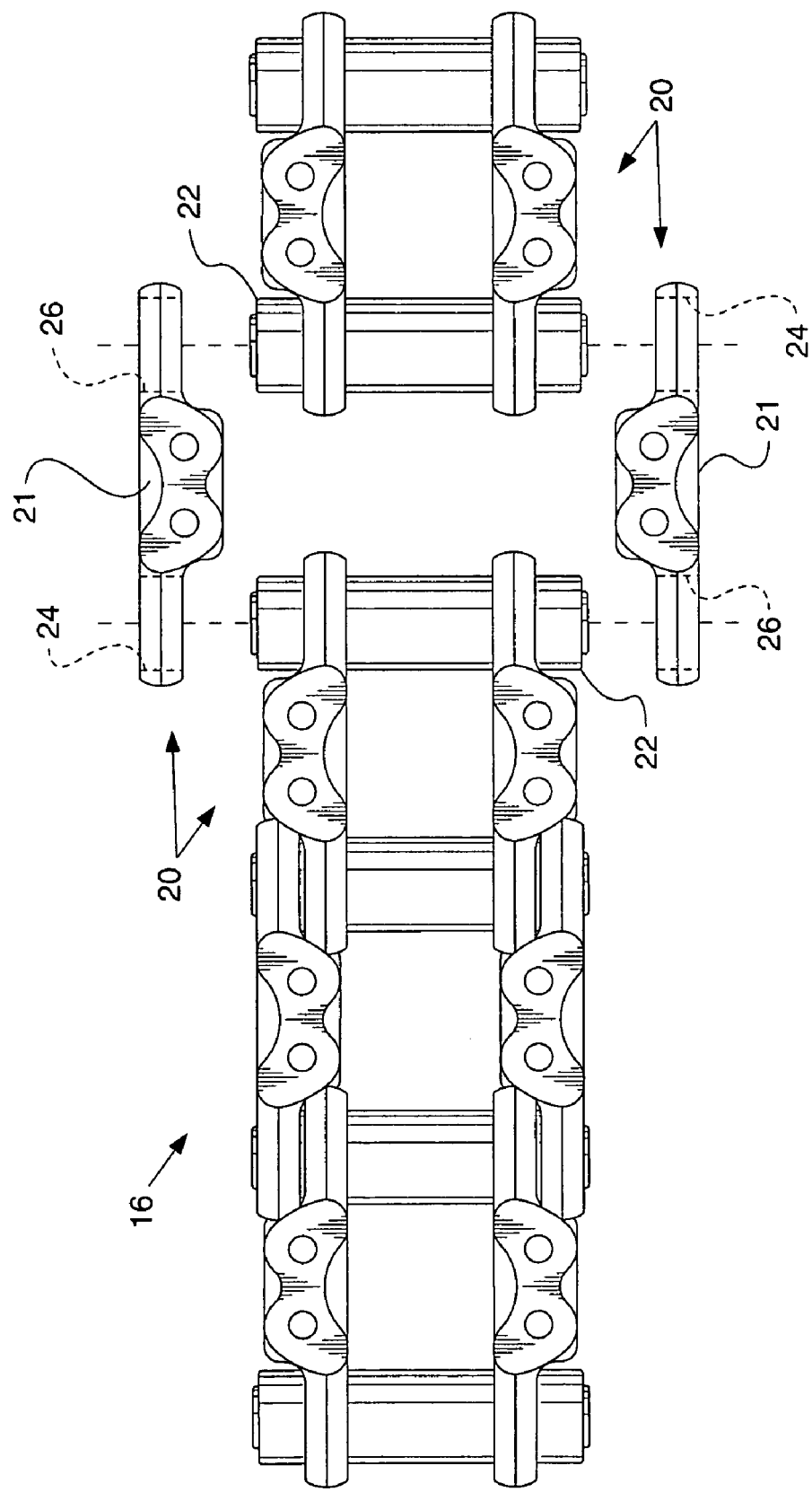
FIG. 2 is a diagrammatic representation of a track link assembly, taken from the track assembly of FIG. 1, with two track links removed.

As more clearly illustrated in FIG. 2, the track link assembly 16 is composed of a plurality of track links 20 secured together with a plurality of track pin assemblies 22. As is well known, each track link 21 of the plurality of track links 20 has respective track pin bores 24,26 that pressingly receive the ends of the associated track pin assemblies 22. As further illustrated in FIG. 2, the continuous track link assembly 16 is disassembled by removing opposing ones of the track links 21. Likewise, the continuous track link assembly 16 is connected into a continuous loop by pressing the last two opposing track links 21 onto the associated track pin assemblies 22. In order to remove the opposed track links 21, it is necessary to pull the respective track links 21 from the associated track pin assemblies 22. Since the track assembly 12 is mounted on the machine 10, a portable disassembly tool 30, illustrated in FIGS. 3 and 4, is needed to remove the track links 21 from the track link assembly 16.

Figure 3:
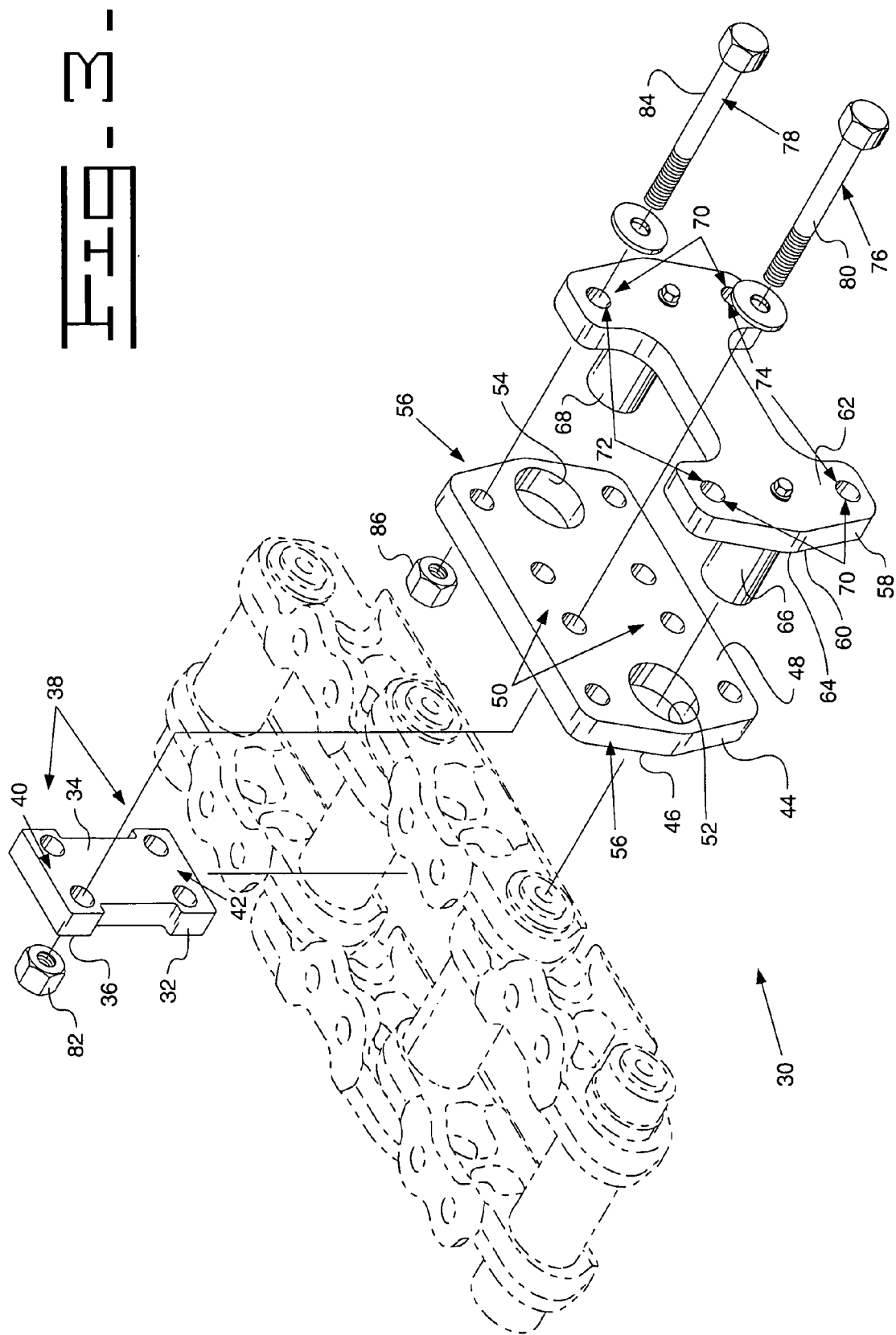
FIG. 3 is a diagrammatic representation of a disassembly tool incorporating the subject invention.
Figure 4:
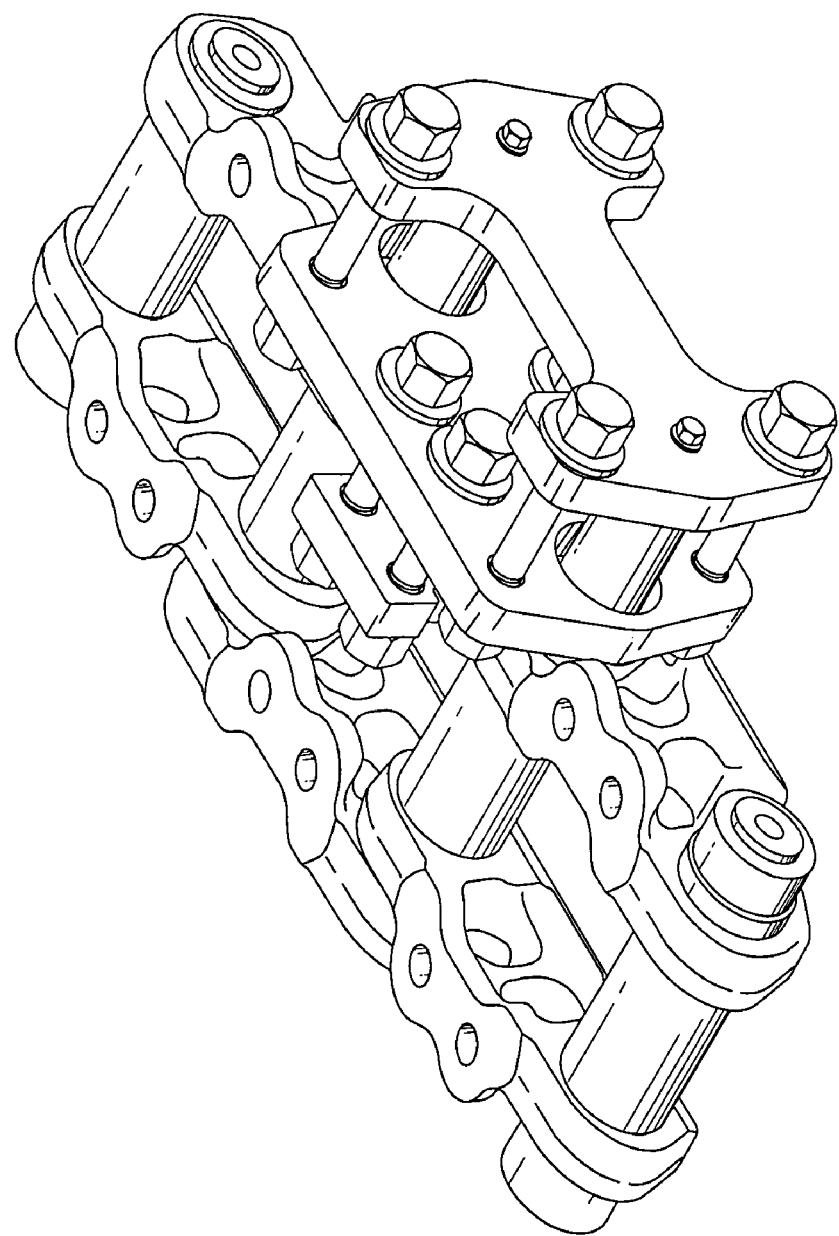
FIG. 4 is a diagrammatic representation of the disassembly tool of FIG. 3 attached to a track link of the track link assembly in preparation for removal of the track link.

As illustrated in FIGS. 3 and 4, the portable disassembly tool 30 includes a first member 32 having a first, flat side 34 and a second side 36. A plurality of holes 38 are defined in the first member 32 between the first and second sides 34,36 thereof. In the subject embodiment, the plurality of holes 38 is composed of four holes spaced from one another in a predetermined pattern. A first portion 40 of the plurality of holes 38 are located on one portion of the first member 32 and a second portion 42 of the plurality of holes 38 are spaced from the first portion 40 so that when the first member 30 is positioned with respect to the track link 21, as illustrated in FIG. 4, the first portion 40 of the plurality of holes 38 is disposed above the track link 21 and the second portion 42 thereof is disposed below the track link 21.

A second member 44 is provided and includes a first, flat side 46 and a second side 48. A first plurality of holes 50 are defined in the second member 44 between the first and second sides 46,48 thereof. The first plurality of holes 50 in the second member 44 is disposed therein in a matching relationship with the plurality of holes 38 in the first member 32.

First and second clearance holes 52,54 are defined in the second member 44 between the first and second sides 46,48 thereof and spaced from one another at a predetermined distance. The predetermined spacing distance being equal to the spacing between two adjacent track pin assemblies 22 of the track link assembly 16. The respective clearance holes 52,54 are of a size sufficient to freely receive the ends of the track pin assemblies 22.

A second plurality of holes 56 are defined in the second member 44 between the first and second sides 46,48 thereof and spaced from one another in a predetermined pattern. In the subject embodiment, the second plurality of holes 56 include four holes and each one of two of the respective holes 56 are disposed above and below the first clearance hole 52 and each one of the other two of the respective holes 56 are disposed above and below the second clearance hole 54.

A third member 60 is provided and has first and second sides 62,64. First and second spacer members 66,68 are secured to the first side 62 thereof and extend a predetermined distance outward therefrom. The first and second spacer members 66,68 are spaced from each other a distance equal to the distance between adjacent ones of the track pin assemblies 22 of the track link assembly 16. Each one of the first and second spacer members 66,68 is of a size sufficient to freely pass through the first and second clearance holes 52,54 of the second member 44 and to extend adistance beyond the first side 46 thereof.

A plurality of holes 70 are defined in the third member 58 between the first and second sides 62,64 thereof. The plurality of holes 70 are disposed in the third member 60 in a matching relationship to the second plurality of holes 56 in the second member 44. A first portion 72 of the plurality of holes 70 is disposed in the third member 58 above the connection of each of the spacer members 66,68 and a second portion 74 of the plurality of holes 70 is disposed in the third member 58 below the connection of the spacer members 66,68.

A first plurality of fasteners 76 operatively connect the first and second members 32,44 together through the plurality of holes 38 in the first member 32 and the first plurality of holes 50 in the second member. The first plurality of fasteners 76 are composed of bolts 80 and nuts 82.

A second plurality of fasteners 78 operatively connect the second and third members 44,58 together through the second plurality of holes 56 in the second member 44 and the plurality of holes 70 in the third member 58. The second plurality of fasteners 76 are composed of bolts 84 and nuts 86.

It is recognized that the first, second, and third members 32,44,58 could have a shape different than that illustrated in the drawings without departing from the essence of the subject invention. For example, strengthening ribs or the like could be added as needed to the second sides 36,48,62 of each of the members. Likewise, the plurality of holes 38 in the first member 32 and the second plurality of holes 56 in the second member 44 could be threaded to receive the respective plurality of fasteners 76,78.

INDUSTRIAL APPLICABILITY

In the use of the portable disassembly tool 30, as illustrated in FIGS. 3 and 4, the first member 32 is disposed between the track links 21 so that the first, flat side 34 thereof is placed into contact with the inside surface of the track link 21. Then the second member 44 is placed against the outside surface of the track link 21 so that the first, flat side 46 thereof is in contact therewith and the ends of the associated track pin assemblies 22 are disposed within the first and second clearance holes 52,54. While holding the first and second members 32,44 in place, the bolts 80 are disposed through the first plurality of holes 50 in the second member 44 and through the plurality of holes 38 of the first member 32. The nuts 82 are then threaded onto the respective bolts 80 and tightened to securely trap the track link 21 therebetween.

The ends of the first and second spacer members 66,68 of the third member 58 are inserted into the respective first and second clearance holes 52,54 of the second member 44 until they contact the ends of the associated track pin assemblies 22. While holding the third member in place, the bolts 84 are inserted through the plurality of holes 70 in the third member 58 and through the second plurality of holes 56 of the second member 44. The nuts 84 are then threaded onto the respective bolts 84 and hand tightened.

The second plurality of fasteners 78 are then alternately tightened in order to pull the track link 21 from the associated track pin assemblies 22. The term 'alternately tightened' means to tighten each of the bolts in a manner to ensure that the track link 21 is pulled in a straight, parallel manner with respect to the associated track pin assemblies 22. If the track link 21 begins to bind in a side to side fashion relative to the track pin assemblies 22 then one or both of the two bolts 84 on one end or the other needs to be tightened to straighten the track link 21 with respect to the track pin assemblies 22. If the track link 21 begins to bind in a top to bottom fashion relative to the track pin assemblies 22 then one or both of the two bolts 84 on the top or bottom needs to be tightened to straighten the track link 21 with respect to the track pin assemblies 22.

Once the first track link 21 has been removed, a strap or other securing device may be secured to the adjacent track pin assemblies 22 and the opposed track link 21 may be removed in the same manner as the first.

From the foregoing, it is readily apparent that the subject portable disassembly tool 30 is simple in construction and functions to easily remove track links 21 from a track link assembly 16 without having problems with binding of the track link 21 in any direction with respect to the associated track pin assemblies 22.

What is claimed is:

1. A portable disassembly tool for removing a track link from a track link assembly having a plurality of track links operatively coupled to a plurality of track pin assemblies, comprising:
   a first member having a first, flat side and a second side with a plurality of holes defined therein between the first, flat side and the second side;
   a second member having a first, flat side and a second side, a first plurality of holes defined in the second member between the first, flat side and the second side thereof and disposed therein in matching relationship with the plurality of holes in the first member, a second plurality of holes defined in the second member between the first, flat side and the second side, and a pair of clearance holes defined in the second member between the first, flat side and the second side, the respective clearance holes being spaced from one another at a predetermined distance and of a size sufficient to freely receive the end of the respective track pin assemblies of the track link assembly;
   a third member having first and second sides, a plurality of holes defined in the third member in matching relationship with the second plurality of holes in the second member, and first and second spacer members connected to and extending from the first side of the third member, the first and second spacer members being spaced from one another at a predetermined distance that is equal to the predetermined distance of the clearance holes that are defined in the second member and of a size sufficient to freely pass through the respective clearance holes in the second member;
   a first plurality of fasteners operative to connect the first and second members through the plurality of holes in the first member and the first plurality of holes in the second member; and
   a second plurality of fasteners operative to connect the second and third members through the second plurality of holes in the second member and the plurality of holes in the third member.

2. The portable disassembly tool of claim 1 wherein the first and second members are operative to firmly secure the track link to be removed therebetween with the clearance holes of the second member being operative to receive the ends of the respective track pin assemblies.

3. The portable disassembly tool of claim 2 wherein the first and second spacers of the third member are operatively disposed within the respective clearance holes of the second member into operative contact with the associated track pin assemblies and the second plurality of fasteners secure the third member to the second member.

4. The portable disassembly tool of claim 1 wherein the respective fastener of the second plurality of fasteners is tightened in an alternate manner in order to pull the track link from the associated track pin assemblies.

5. The portable disassembly tool of claim 1 wherein a first portion of the plurality of holes in the first member is operatively disposed at a location above the top side of the track link and a second portion of the plurality of holes in the first member is operatively disposed at a location below the bottom side of the track link.

6. The portable disassembly tool of claim 1 wherein a first portion of the plurality of holes in the third member is operatively disposed relative to the track link above the top of the track link and above the respective first and second spacers disposed on the third member, and a second portion of the plurality of holes in the third member is operatively disposed relative to the track link below the bottom of the track link and below the respective first and second spacers disposed on the third member.

7. A method of removing a track link from a track link assembly having a plurality of track links operatively coupled to a plurality of track pin assemblies, comprising the steps of:
   providing a first member having a first, flat side and a second side with a plurality of holes defined therein between the first and second sides;
   providing a second member having a first, flat side and a second side, a first plurality of holes defined in the second member between the first, flat side and the second side thereof and disposed therein in matching relationship with the plurality of holes in the first member, a second plurality of holes defined in the second member between the first, flat side and the second side, and a pair of clearance holes defined in the second member between the first, flat side and the second side, the respective clearance holes being spaced from one another at a predetermined distance and of a size sufficient to freely receive the end of the respective track pin assemblies of the track link assembly;

clamping the track link between the first and second members by locating the first member on the inside of the track link, locating the second member on the outside of the track link and securing the first and second members together with a plurality of fasteners disposed in the plurality of holes of the first and second members;

providing a third member having first and second sides, a plurality of holes being defined in the third member in matching relationship with the second plurality of holes in the second member, first and second spacer members being connected to and extending from the first side of the third member, the first and second spacer members being spaced from one another at a predetermined distance that is equal to the predetermined distance of the clearance holes defined in the second member and of a size sufficient to freely pass through the respective clearance holes in the second member;

locating the first and second spacers of the third member within the first and second clearance holes of the second member and into contact with the end of the respective ones of the track pin assemblies and securing the third member to the second members with a second plurality of fasteners being disposed in the plurality of holes in the third member and the second plurality of holes defined in the second member; and pulling the track link that is clamped between the first and second members from the associated track pin assemblies by alternately tightening the respective fasteners of the second plurality of fasteners.

* * * * *